United States Patent [19]

Cotten, Jr. et al.

[11] 4,367,548

[45] Jan. 4, 1983

[54] SUBSCRIBER STATION FOR PROVIDING MULTIPLE SERVICES TO A SUBSCRIBER

[75] Inventors: Whitworth W. Cotten, Jr., Germantown, Md.; John Tambert, Satellite Beach, Fla.

[73] Assignee: Harris Corporation, Melbourne, Fla.

[21] Appl. No.: 138,991

[22] Filed: Apr. 10, 1980

[51] Int. Cl.³ .............................................. H04N 7/10
[52] U.S. Cl. .................................. 370/3; 179/2 TV; 358/86
[58] Field of Search .................... 370/1, 3, 4; 455/3, 455/4, 5, 606, 608, 610, 612, 617; 358/86; 179/2 TV

[56] References Cited

U.S. PATENT DOCUMENTS

| | | | |
|---|---|---|---|
| 3,746,780 | 7/1973 | Stetten | 179/2 TV |
| 3,757,225 | 9/1973 | Ulicki | 179/2 TV |
| 3,896,267 | 7/1975 | Sachs et al. | 179/2 TV |
| 3,953,727 | 4/1976 | d'Avria et al. | 455/610 |
| 3,999,006 | 12/1976 | Takeuchi et al. | 179/2 TV |
| 4,041,398 | 8/1977 | Ellis | 455/5 |
| 4,057,829 | 11/1977 | Moorehead | 358/86 |
| 4,135,202 | 1/1979 | Cutler | 320/3 |
| 4,150,254 | 4/1979 | Schussler et al. | 179/2 TV |
| 4,227,075 | 10/1980 | Holland | 370/4 |

FOREIGN PATENT DOCUMENTS 2538638  3/1977  Fed. Rep. of Germany ....... 455/612

OTHER PUBLICATIONS

Campbell, Multiterminal Fiber Systems, Laser Focus, Jun. 1978, pp. 42, 44, 45.
Gargini, The Total Communication Concept of the Future, The Royal Tele. Soc. Jour., Mar./Apr. 1973, pp. 182–193.
Gabriel, Dial a Program, an HF Remote Selection Cable Television System, Proc. of the IEEE, vol. 58, #7, Jul. 1970.
Hara, Conceptual Design of a Switched Television Distribution System Using Optical-Fiber Waveguides, IEEE Trans on Cable TV, vol. CATV-2, #3, Jul. 1971.

Primary Examiner—Joseph A. Orsino, Jr,
Attorney, Agent, or Firm—Antonelli, Terry & Wands

[57] ABSTRACT

In order to provide multiple services to a subscriber from a telephone central office, receiving and transmitting cables, preferably each being a single fiber optic strand, are coupled between the subscriber and the central office. Multiple signals, such as telephone signals, television signals, digital data, and FM radio signals are multiplexed onto the receiving cable. These signals are demultiplexed at the subscriber station to allow individual utilization of the services by the subscriber. Control of the services is allowed by transmitting control signals such as telephone control signals and television and FM radio channel selection signals over the transmitting cable, along with the telephone conversations and data. Further, alarm signals can be sent over the respective cables for purposes of monitoring fire, health, and security.

12 Claims, 2 Drawing Figures

FIG. I

SUBSCRIBER STATION FOR PROVIDING MULTIPLE SERVICES TO A SUBSCRIBER

FIELD OF THE INVENTION

This invention relates generally to a method and apparatus for communicating between a telephone central office and a subscriber station, and more particularly to providing multiple services to a subscriber including television signals from a selected television channel unrelated to the telephone signals in addition to normal telephone service over a common cable between the central office and a subscriber station.

BACKGROUND OF THE INVENTION

With the spread of modern electronic technology, it has now become commonplace for households and other subscribers to receive a variety of electronic services. For example, the majority of the homes in the western world now have telephones, televisions, and FM radio receivers. Further, more recently, to improve the range of television and FM radio channels available to subscribers, especially in areas remote from broadcasting centers, cable television is becoming ever more popular.

One problem which has existed with the growth of cable television has been the need to provide lines for it to each household which are separate from existing telephone service lines. Thus, if a subscriber desires cable television services, additional material and labor costs are necessary to provide the incoming lines to the household. This has continued to be the case even with the introduction of fiber optic lines for individual subscriber telephone service.

SUMMARY OF THE INVENTION

It is, therefore, an object of the present invention to provide new and improved methods of and apparatus for communicating between subscriber stations and telephone central offices.

It is a further object of the present invention to eliminate the need for separate lines to individual subscriber stations by making arrangements for providing multiple services, including television and telephone signals, to subscriber stations on a single duplex cable between the subscriber station and the telephone central office.

To accomplish these and other objects, the present invention provides a subscriber station and a method for its operation, wherein the subscriber station is coupled to the telephone central office by a duplex cable. The telephone central office has the ability of providing one or more television channels unrelated to the telephone service. The duplex cable includes a subscriber receiving cable and a subscriber transmitting cable. A receiver at the subscriber station receives signals from at least one selected television channel and telephone signals multiplexed on said receiving cable. These received signals are demultiplexed to provide individual television and telephone signals for utilization at the subscriber station. The subscriber station also includes a transmitter for transmitting telephone signals including telephone control signals to the central office on said transmitting cable. Further, arrangements are provided for transmitting channel selection signals over the transmitting cable.

BRIEF DESCRIPTION OF THE DRAWINGS

Other objects and advantages of the present invention may be more clearly understood by reference to the following detailed description and drawings wherein.

DETAILED DESCRIPTION OF THE PREFERRED EMBODIMENTS

Figure 1:
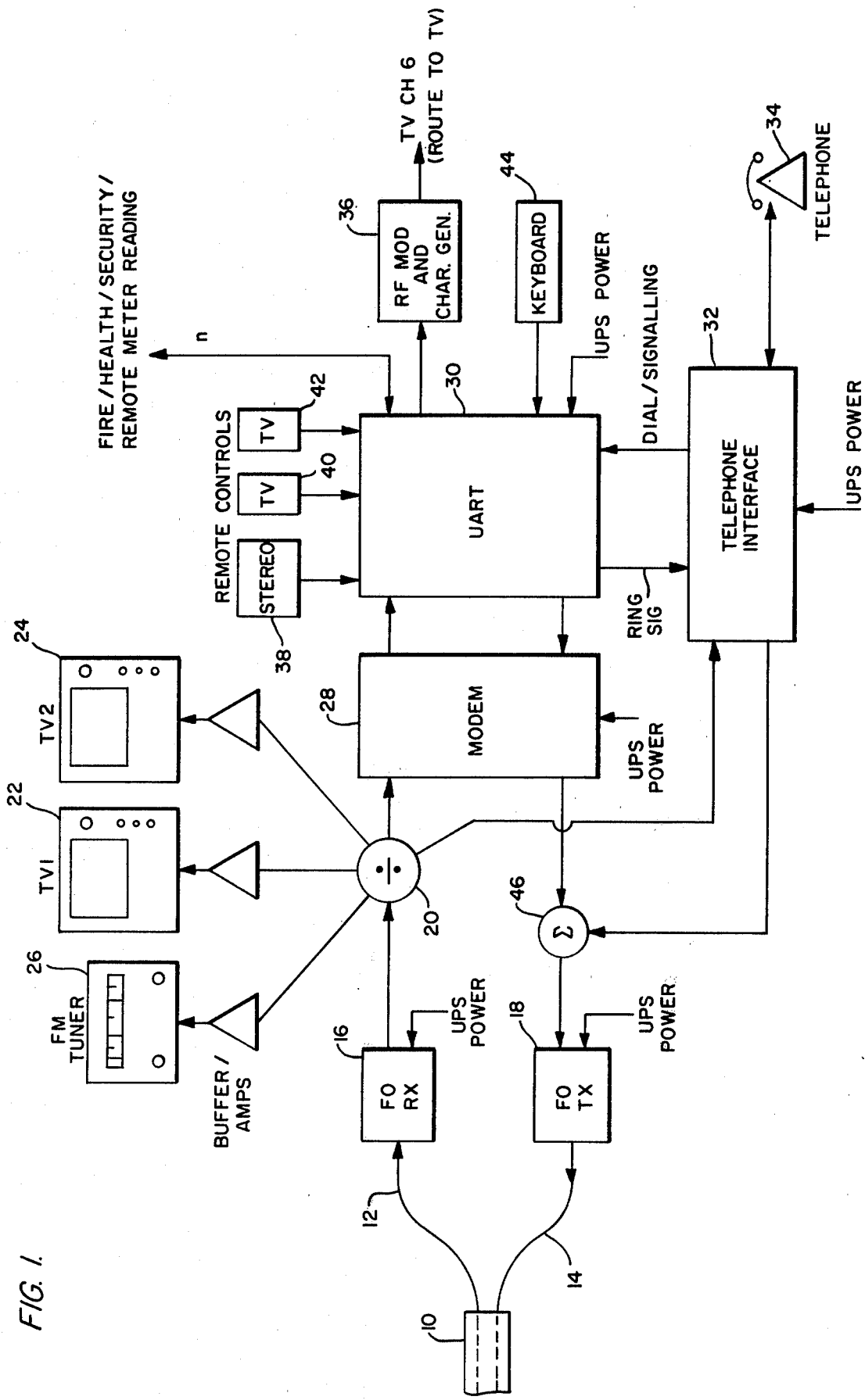
FIG. 1 is a block diagram showing a preferred embodiment of the invention.

Referring now to the drawings, FIG. 1 shows a subscriber station according to the present invention having a duplex fiber optic input-output cable 10 comprising a receiving cable 12 and a transmitting cable 14. The receiving cable 12 is coupled to a fiber optic receiver 16, and the transmitting cable 14 is coupled to a fiber optic transmitter 18. The fiber optic receiver 16 and transmitter 18 are both conventional fiber optic units for conversion of light signals to radio frequency signals and of radio frequency signals to light signals, respectively.

The duplex cable 10 is coupled at its opposite end to a telephone central office (not shown). This central office has the capability of transmitting at least one television channel which is unrelated to the telephone service. Arrangements are provided for frequency division multiplexing the television channel signal onto a receiving cable 12 along with the telephone signals (which can occupy, for example, a range from 0.3 to 3 KHz) so that only a single receiving cable is necessary for providing both services to a subscriber. Also, additional signals including FM radio signals, and data signals (e.g. ASCII signals) can be multiplexed onto the receiving cable. Such an arrangement for frequency division multiplexing the respective signals is discussed in the related case Ser. No. 139,113 filed Apr. 10, 1980, now abandoned entitled "Broadband Distribution System for Providing Multiple Services from a Telephone Central Office to a Subscriber," by P. W. Casper and N. C. Seiler, assigned to the same assignee as the present invention and filed on even date herewith. This related application is herein incorporated by reference.

From the fiber optic receiver 16, the composite signal with the television signals, telephone signals, FM radio signals, and data signals is passed to an RF splitter 20 for separating the television and FM radio signals from the telephone and data signals. The television signals are then passed to the subscriber television sets 22 and 24 while the FM radio signals are passed to an FM tuner 26. Telephone signals and data signals, on the other hand, are passed from the power splitter 20 to a modem 28 which will demodulate the received signals and then pass them to a universal asynchronous receive-transmit device 30 (hereinafter referred to as UART 30). The telephone output signals from the UART 30 are then in turn passed to a telephone interface 32 and then to a subscriber telephone 34. The data signals, on the other hand, are passed to an RF modulator and character generator 36. This RF modulator and character generator 36 will convert the received data to a dot matrix format, in a conventional manner, for display on a selected television channel.

Remote control for the FM radio and television service is provided by controls 38, 40, and 42 which are coupled to the UART 30. Generally, key pads can be used for these remote controls to provide a word signifying the selected channel. The key pad output is passed to the UART 30 to provide a serially formated output indicative of the selected channel. This serial output is then passed to the modem 28, a power summer 46, and the fiber optic transmitter 18 to modulate and transmit the word representing the selected channel for transmission over the transmitting cable 14.

Similarly, data transmission can be accomplished by the use of a keyboard 44 coupled to the UART 30 for data entry from the subscriber. This data is then passed through the modem 28, the power summer 46, and the fiber optic transmitter 18 for transmission over the fiber optic transmitting cable 14 in a manner similar to the television and FM channel selection signals.

Figure 2:
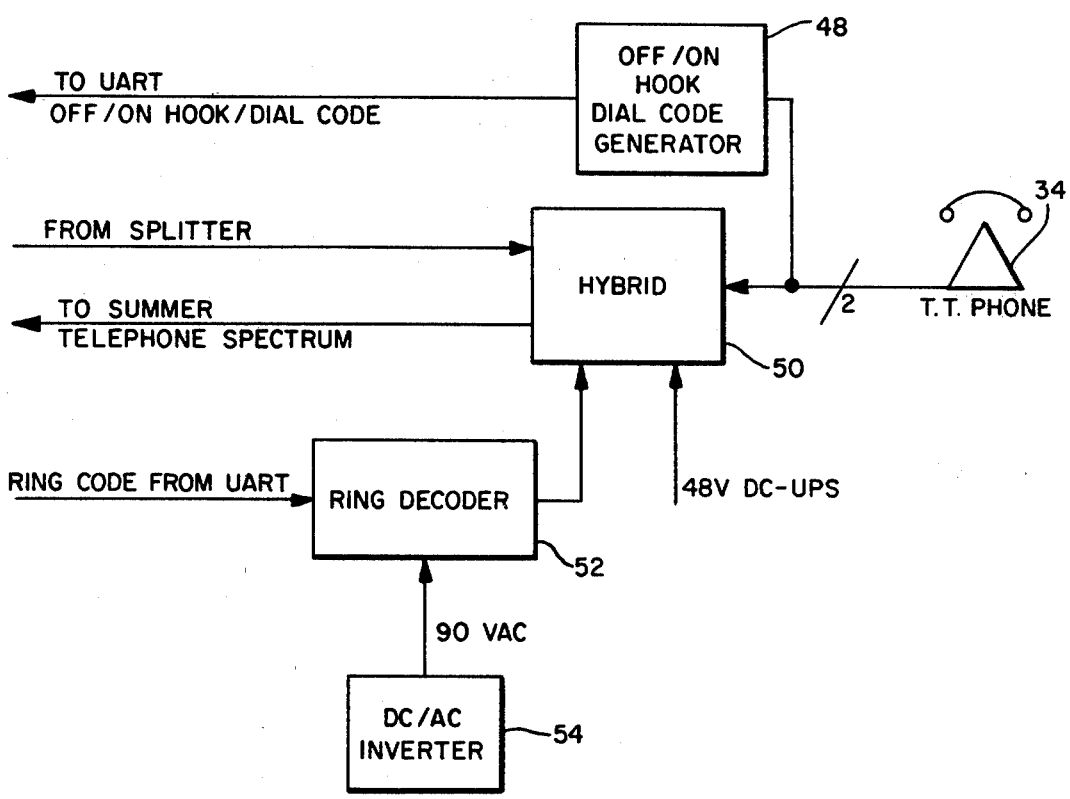
FIG. 2 is a block diagram showing the telephone interface of FIG. 1.

The combination of the telephone signals with television signals, FM radio signals, and data signals is accomplished by the use of a telephone interface 32. This telephone interface 32 is coupled to the UART 30, the telephone 34, the power splitter 20, and the power summer 46. A detailed block diagram of the telephone interface 32 is shown in FIG. 2. The preferred telephone 34 for use with this arrangement would be a touch tone telephone.

In operation of the telephone interface 32, when attempting to make a call the off-hook condition is detected by an on/off hook-dial code generator 48, and a proper word is generated to the UART 30, initiating control signal transmission to the central office. If a trunk is available, the central office will respond with a dial tone which is received from the power splitter 20 through a hybrid 50 and passed to the telephone earpiece. Upon receipt of the dial tone, touch tone dialing can commence, and the digits in the touch tone format are decoded by the on/off hook-dial code generator 48 and converted into a word which is transmitted to the UART 30 for transmission to the central office. Ringback is generated at the central office and heard by the subscriber through the power splitter 20 and the hybrid 50. If the called party goes off hook, the telephone connection is completed until an on-hook code is detected and transmitted back to the central office which releases the trunk.

When a call is to be received, the ring code is code-detected by the UART 30 and applied to a ring decoder 52. This enables a DC/AC inverter 54 to apply voltage at the proper frequency to the ringer of the telephone 34.

In addition to the above-discussed services, the present invention also can be used for providing signals for fire alarms, health alarms, security alarms, and remote meter readings. Conventional alarms or meters for these purposes can be coupled to the UART 30 to provide signals thereto under conditions for which the alarms or readings are intended. The UART 30 will then pass such signals to the modem 28 and the power summer 46 in the same manner as the above-discussed signals.

The combination of the UART 30, modem 28, telephone interface 32, and power summer 46 allows for frequency division multiplexing of the various signals to be transmitted from the fiber optic transmitter 18 on the transmitting cable 14. It can be appreciated that by virtue of this, and the receiving arrangements discussed above, a wide variety of services can be provided to a subscriber with a minimal amount of line connections into the subscriber's residence.

Although the present system is intended for use with an alternating current normally provided to subscribers, it is desirable that an uninterrupted power source (UPS) be provided for essential services such as telephone and various alarms. Such UPS systems essentially incorporate a battery which is charged during connection of the AC power, and coupled to provide power to the essential units during AC power failure. These UPS systems are well known in the art, and can be incorporated into the present system by applying inputs therefrom into the telephone interface 32, the UART 30, the modem 28, and the fiber optic transmitter and receiver 18 and 16, respectively.

It should also be noted that the various units discussed above, such as the modem 28, the UART 30, the RF modulators and character generator, and the various elements of the telephone interface 32, are conventional units which can be readily constructed by those of ordinary skill in the art.

Further, it should be noted that the present system can operate or be designed for a desired number of television and FM radio channels. For example, the central office could provide thirty television stations and six FM radio stations. Then, it might be desirable to design the system to allow the subscriber to select two out of the thirty television stations (e.g. so that viewers at the subscriber station could watch different television shows on different television sets) and one out of the six FM stations. The necessary bandwidths for frequency division multiplexing two television stations, one FM radio station, telephone service signals, ASCII data signals, and the various alarm signals onto the respective transmitting and receiving cables is well within the capability of present fiber optic cables. Of course, other arrangements using different amounts of respective services could be provided as long as the bandwidth capabilities of the cables and receiving-transmitting equipment were not exceeded.

It is to be understood that the above-described arrangements are simply illustrative of the application of the principles of this invention. Numerous other arrangements may be readily devised by those skilled in the art which embody the principles of the invention and fall within its spirit and scope.

We claim:

1. A subscriber station for multiplexed communication with a telephone central office which provides one or more television channels unrelated to the telephone signals in addition to telephone service, comprising:

a single fiber optic receiving cable coupled between said subscriber station and said telephone central office;

a single fiber optic transmitting cable coupled between said subscriber station and said telephone central office;

a fiber optic receiver for receiving light television signals from said telephone central office for at least one selected television channel and light telephone signals frequency division multiplexed on said receiving cable, wherein the fiber optic receiver converts the received light signals into radio frequency electrical signals;

a radio frequency splitter coupled to the output of said fiber optic receiver for separating the television signals from the telephone signals;

a modem coupled to the radio frequency splitter to receive telephone signals from the radio frequency splitter;

a universal asynchronous receive-transmit circuit coupled to the modem to transmit and receive signals between said modem and said universal asynchronous receive-transmit device;

a telephone interface circuit coupled to said universal asynchronous receive-transmit device and to the output of said radio frequency splitter for receiving telephone signals from both the universal asynchronous receive-transmit device and said radio frequency splitter and providing the signals to a telephone coupled to the output of the telephone interface circuit;

a radio frequency summer coupled to the output of the telephone interface circuit and the output of the modem; and a fiber optic transmitter coupled to the output of said radio frequency summer for converting the radio frequency signals to light telephone signals for transmission to the telephone central office.

2. A subscriber station according to claim 1 further comprising means for transmitting television channel selection signals on the transmitting cable to select a desired television channel at said central office wherein said television channel selection signals are frequency division multiplexed onto said transmitting cable along with said telephone signals.

3. A subscriber station according to claim 1, wherein the received telephone signals include dial tone signals, ring signals, busy tone signals, on-hook signals, and voice signals.

4. A subscriber station according to claim 1, wherein the transmitted signals include on/off hook signals, dial signals, and voice signals.

5. A subscriber station according to claim 1, wherein the transmitted signal includes a fire alarm signal.

6. A subscriber station according to claim 1, wherein the transmitted signal includes a security alarm signal.

7. A subscriber station according to claim 1, wherein the transmitted signal includes a health alarm signal.

8. A subscriber station according to claim 1, wherein the transmitted signal includes a remote meter reading signal.

9. A subscriber station according to claim 1, wherein the received signal includes an FM radio channel.

10. A subscriber station according to claim 1, wherein the transmitted signal includes an FM radio channel selection signal.

11. A subscriber station according to claim 1, wherein the transmitted signal includes a digital data signal and the received signal includes a digital data signal wherein the subscriber station includes means for converting the received digital data signal to dot matrix signals for display on a selected television channel.

12. A subscriber station according to claim 1, further comprising means to transmit a television channel selection signal on the transmitting cable to select a desired television channel at said central office, wherein said signals provided on said transmitting cable are frequency division multiplexed thereon.

* * * * *